April 20, 1948.  R. F. DOLLASE  2,439,967
TRAILER HITCH
Filed June 10, 1946
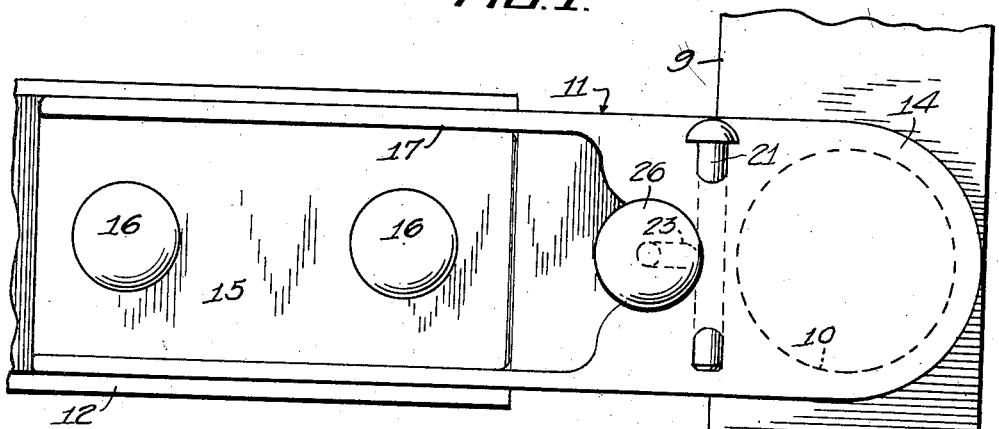
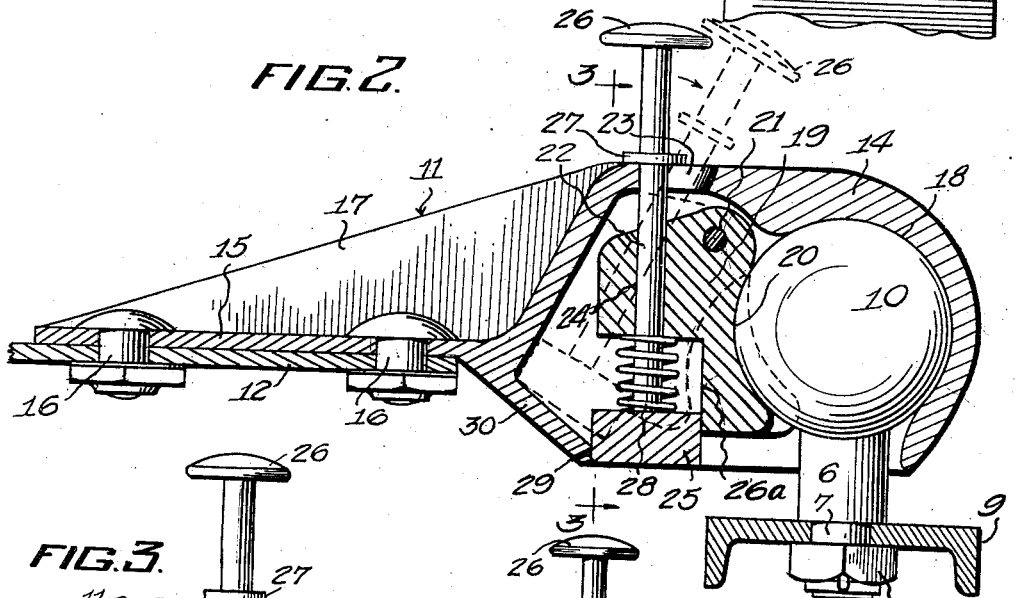
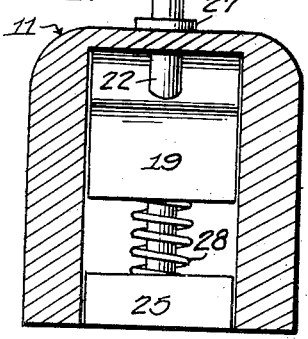
Inventor
ROBERT F. DOLLASE
By
Attorney.

Patented Apr. 20, 1948

2,439,967

UNITED STATES PATENT OFFICE 2,439,967

TRAILER HITCH

Robert F. Dollase, Fort Atkinson, Wis.

Application June 10, 1946, Serial No. 675,615

6 Claims. (Cl. 280—33.17)

This invention relates to a trailer hitch.

It is primarily aimed to provide a novel construction which is exceptionally durable, readily operable, and in which the movable parts are efficiently protected against the elements, and a structure which is capable of expeditious manufacture at minimum cost.

A prime object is to provide such a structure having one of the parts primarily as a housing including a novel latch means which holds a movable part thereof efficiently against danger of accidental displacement, and such part preferably biased to a position in which there is an abutment at both the front and rear.

Further, an important object is to provide such a structure wherein the latch will be releasably held in its retracted position with a part of the housing also retracted to enable more ready engagement and disengagement between the same and associated element, usually a ball.

The more specific objects and advantages will become apparent from a consideration of the description following, taken in connection with the accompanying drawings illustrating an operative embodiment by way of example. In said drawings:

Fig. 1 is a plan view of the improved trailer hitch;

Fig. 2 is a vertical sectional view approximately centrally and longitudinally;

Fig. 3 is a vertical transverse sectional view taken on the plane of line 3—3 of Fig. 2; and Fig. 4 is a fragmentary vertical sectional view through a modified form, taken on a plane corresponding to that of Fig. 2.

Referring specifically to the drawings, wherein like reference characters designate like or similar parts throughout the different views, one of the vehicles, for instance the draft vehicle, is equipped with a stud 6 which may be of any desired form. For instance, this stud 6 has a screw-threaded shank 7 whereby it may be bolted or otherwise attached at 8 to a bracket or channel bar 9 suitably secured to the vehicle. Stud 6 may be of any desired form, but preferably employs a ball 10. The other section of the hitch, which is designated 11, is carried by the other vehicle, for instance the trailer, represented by the part 12, to which attachment may be made. The section 11 is adapted to be attached or detached from the stud 6 in connecting or detaching the draft and trailing vehicles.

Said section 11 is practically an enclosed or hollow body or housing at 14 so as to better protect the parts therein against the elements. This section may be a metallic casting having a plate 15 equipped with suitable holes through which the bolts 16 are passed in order to detachably mount it on the part 12 of the trailer. Reinforcing webs 17 form part of the casting for section 11 and are united with the housing 14 and plate 15.

Said housing 14 is open from below to enable engagement with and disengagement from the previously mentioned ball or equivalent 10. The interior wall of housing 14 is spherical as at 18 for direct contact with the surface of the ball 10. The surface 18 however is of such extent as to enable removal of ball 10, and in order to retain ball 10 and extend said spherical surface, a bearing head 19 is provided. Said head 19 has a spherical surface 20 to contact the surface of ball 10. Head 19 is mounted and movable within the interior space of housing 14 on a pivot pin or the equivalent 21 passing transversely across housing 14 and through the head 19.

A manually operable rod 22 is slidably disposed through an enlarged opening 23 in the upper wall of housing 14 and through an opening 24 in the head 19 and at its lower end is enlarged or provided with a block to form a latch 25. Rod 22 may be operated by a handle 26 in the manner suggested by the dotted lines in Fig. 2, and its downward movement is limited by a flange 27 on the rod engaging the housing 14. Said rod and connected parts are biased to lowermost position through the expansive action of a coiled spring 28 which surrounds the rod and bears at opposite ends against the head 19 and the latch 25 respectively. Thus in the full line position shown most advantageously in Fig. 2, the sections of the hitch are coupled so as to have a ball and socket movement at the ball 10 and surfaces 18 and 20. The parts are held against danger of accidental detachment especially due to the fact that the latch 25 at the forward face is in abutting contact with a vertical surface or face 26a of the head 19 which is cut away to provide it and accommodate the spring 28 to the movement of the latter and latch 25. In addition, latch 25 at its rear surface abuts the forward edge 29 of a downwardly and forwardly inclined bottom wall 30 of the housing. Thus it will be seen that the latch 25 is abutted by the walls within the housing at both front and rear. In order to retract the head 19 to release or receive the ball 10, handle 26 is raised to move the latch 25 above the edge 29, and it is then pushed forwardly, to dispose the latch 25 in rearmost position on the wall 30, as shown by dotted lines. This operation not only retracts the head 19, but it maintains the latter retracted, which greatly facilitates the attachment or detachment relative to the ball 10. The tension of the spring 28 also serves to maintain the latch in its retracted or dotted line position of Fig. 2 against undue danger of accidental displacement.

Various changes may be resorted to provided they fall within the spirit and scope of the invention. For instance, I may resort to the form suggested in Fig. 4, which agrees with the form previously described except that the latch 25 rests on an extension 31 of the wall 30 and abuts a shoulder at 32 formed at the junction of wall 30 and extension 31. The abutment 32 thus replaces the abutment at 29 of the first form. The operation in this modified form is similar to that of the first form.

What is claimed is:

1. A trailer hitch having a body closed at the top and open from below, said body being hollow and having a spherical surface for engagement with a ball of a stud, a retaining head in said body, said head having a spherical surface for engagement with said ball, the top of the body having an opening therein, a rod extending through said body opening in the top of the body and slidably through the said head, said opening through which the rod extends being enlarged with respect thereto, said head having an abutment surface and said body having an abutment surface, a latch carried by the rod disposed between said abutment surfaces, and means biasing the latch to the latter position.

2. A trailer hitch element for engagement with a stud or the like, said element comprising a housing open at its lower side, a head pivotally mounted in the housing and cooperating therewith to retain the stud in the housing, operating means slidably extending through said head for pivotally moving the head, a latch carried by the operating means, abutment surfaces on the housing and head with the latch normally disposed therebetween for holding the head against pivotal movement, means for limiting sliding movement of said operating means and means for biasing the latch to a position between the abutment surfaces.

3. A trailer hitch element for engagement with a stud or the like, said element comprising a housing open at its lower side, a head pivotally mounted in the housing and cooperating therewith to retain the stud in the housing, operating means slidably extending through said head for pivotally moving the head, a latch carried by the operating means, abutment surfaces on the housing and head with the latch normally disposed therebetween for holding the head against pivotal movement, means for limiting sliding movement of said operating means and means for biasing the latch to a position between the abutment surfaces, and said abutment surface on the housing forming a part of the wall thereof and said operating means being movable with the pivoted head and disposable in contact with the inner surface of said wall.

4. A trailer hitch element for engagement with a stud or the like, said element comprising a housing open at its lower side, a head pivotally mounted in the housing and cooperating therewith to retain the stud in the housing, operating means slidably extending through said head for pivotally moving the head, a latch carried by the operating means, abutment surfaces on the housing and head with the latch normally disposed therebetween for holding the head against pivotal movement, means for limiting sliding movement of said operating means and means for biasing the latch to a position between the abutment surfaces, the abutment surface on the housing forming a part of a wall thereof and said operating means being movable with the pivoted head and disposable in contact with the inner surface of said wall, said housing having an enlarged opening in the upper wall thereof through which said operating means extends for sliding movement and pivotal movement with said head.

5. A trailer hitch element for engagement with a stud or the like, said element comprising a housing open at its lower side, a head pivotally mounted in the housing and cooperating therewith to retain the stud in the housing, operating means slidably extending through said head for pivotally moving the head, a latch carried by the operating means, abutment surfaces on the housing and head with the latch normally disposed therebetween for holding the head against pivotal movement, means for limiting sliding movement of said operating means, means for biasing the latch to a position between the abutment surfaces, and an extension wall on the housing at the lower side thereof adjacent the abutment surface on the housing forming a rest for said latch.

6. A trailer hitch element for engagement with a stud or the like, said element comprising a housing open at its lower side, a head pivotally mounted in the housing and cooperating therewith to retain the stud in the housing, operating means slidably extending through said head for pivotally moving the head, a latch carried by the operating means, abutment surfaces on the housing and head with the latch normally disposed therebetween for holding the head against pivotal movement, means for limiting sliding movement of said operating means and means for biasing the latch to a position between the abutment surfaces, with the latch extending downwardly into an opening at the lower side of the housing and having its lower face entirely exposed and substantially in the plane of the lower side of the housing.

ROBERT F. DOLLASE.

REFERENCES CITED

The following references are of record in the file of this patent:

UNITED STATES PATENTS

| Number | Name | Date |
|---|---|---|
| 2,189,710 | Draeger | Feb. 6, 1940 |
| 2,237,031 | Gilmore | Apr. 1, 1941 |
| 2,265,850 | Martin | Dec. 9, 1941 |